(12) United States Patent
Yuan et al.

(10) Patent No.: US 10,678,308 B2
(45) Date of Patent: Jun. 9, 2020

(54) ELECTRONIC DEVICE

(71) Applicant: Lenovo (Beijing) Co., Ltd., Beijing (CN)

(72) Inventors: Chunfeng Yuan, Beijing (CN); Detao You, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 411 days.

(21) Appl. No.: 15/469,853

(22) Filed: Mar. 27, 2017

(65) Prior Publication Data
US 2018/0136698 A1    May 17, 2018

(30) Foreign Application Priority Data

Nov. 15, 2016 (CN) .......................... 2016 1 1005852

(51) Int. Cl.
*E05D 3/06* (2006.01)
*E05D 11/08* (2006.01)
*G06F 1/16* (2006.01)

(52) U.S. Cl.
CPC .......... *G06F 1/1681* (2013.01); *G06F 1/1618* (2013.01)

(58) Field of Classification Search
CPC .. E05D 3/12; E05D 3/122; E05D 3/06; E05D 3/10; E05D 11/082; E05D 11/087; E05D 2011/085; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/541

See application file for complete search history.

(56) References Cited

U.S. PATENT DOCUMENTS

| | | | | |
|---|---|---|---|---|
| 9,411,365 | B1* | 8/2016 | Tanner | G06F 1/1618 |
| 9,534,432 | B2* | 1/2017 | Lee | G06F 1/1681 |
| 2005/0050686 | A1* | 3/2005 | Kurokawa | G06F 1/1618 |
| | | | | 16/354 |
| 2006/0238968 | A1* | 10/2006 | Maatta | H04M 1/0218 |
| | | | | 361/679.01 |
| 2008/0109995 | A1* | 5/2008 | Kuwajima | H04M 1/022 |
| | | | | 16/354 |
| 2009/0070961 | A1* | 3/2009 | Chung | E05D 3/122 |
| | | | | 16/354 |
| 2011/0257780 | A1* | 10/2011 | Cosgrove | G06Q 10/10 |
| | | | | 700/117 |

(Continued)

FOREIGN PATENT DOCUMENTS

| | | |
|---|---|---|
| CN | 203926362 U | 11/2014 |
| CN | 203979112 U | 12/2014 |

(Continued)

*Primary Examiner* — Chuck Y Mah

(74) *Attorney, Agent, or Firm* — Anova Law Group, PLLC

(57) ABSTRACT

An electronic device is provided. The electronic device comprises a first part; a second part; a connector; and a shaft rotationally coupling the first part and the second part through the connector. End portions of the connector extend outside a connecting edge of the first part and a connecting edge of the second part, respectively. The shaft is coupled to the end portions of the connector. The shaft is disposed at an outer side of the connecting edge of the first part and an outer side of the connecting edge of the second part.

17 Claims, 4 Drawing Sheets

(56) References Cited

U.S. PATENT DOCUMENTS

| | | | | |
|---|---|---|---|---|
| 2013/0111704 A1* | 5/2013 | Mitsui | ............... | H04M 1/022 |
| | | | | 16/250 |
| 2013/0139355 A1* | 6/2013 | Lee | ............... | H04M 1/022 |
| | | | | 16/354 |
| 2013/0322004 A1* | 12/2013 | Park | ............... | F16C 11/10 |
| | | | | 361/679.27 |
| 2014/0338483 A1* | 11/2014 | Hsu | ............... | F16H 21/44 |
| | | | | 74/96 |
| 2014/0360296 A1 | 12/2014 | Hsu | | |
| 2015/0047152 A1* | 2/2015 | Cheng | ............... | E05D 3/122 |
| | | | | 16/354 |
| 2015/0146362 A1* | 5/2015 | Meyers | ............... | E05D 3/122 |
| | | | | 361/679.27 |
| 2015/0159413 A1* | 6/2015 | Chen | ............... | E05D 3/122 |
| | | | | 16/342 |
| 2015/0267450 A1* | 9/2015 | Chiang | ............... | G06F 1/1681 |
| | | | | 16/354 |

FOREIGN PATENT DOCUMENTS

| | | |
|---|---|---|
| CN | 104345786 A | 2/2015 |
| CN | 105972062 A | 9/2016 |

* cited by examiner

ELECTRONIC DEVICE

CROSS-REFERENCES TO RELATED APPLICATIONS

This application claims the priority of Chinese patent application No. CN20161 1005852.5, filed on Nov. 15, 2016, the entire content of which is incorporated herein by reference.

FIELD OF THE DISCLOSURE

The present disclosure relates to the technical field of electronic devices and, more particularly, relates to an electronic device having a touchscreen and capable of flipping and folding.

BACKGROUND

Flip-and-fold electronic devices provide various operation modes according to different application scenarios. For example, a flip-and-fold electronic device may be operated in a laptop mode, an audience mode, a presenting modem a tabletop mode, or a tablet mode, etc. In a notebook, a mobile phone and other flip-and-fold electronic devices, the screen and the body of the flip-and-fold electronic device are rotationally coupled to each other through a rotating/flipping mechanism.

In existing technologies, the shaft, which is capable of realizing a 360° flip-and-fold of the screen with respect to the body, often includes a transmission structure or a transmission for realizing a synchronous rotation of the screen and the body, and a torque structure for providing a retention force for the screen to stay in the inverted position. To realize more stylish and beautiful appearance of the electronic devices, the electronic devices are becoming thinner and lighter. As the overall thickness of the electronic device decreases, the overall size of the shaft also has to be reduced.

However, as the overall size of the shaft reduces, the torque structure may be unable to provide sufficient retention force, leading to an accidental rotation of the screen and degrading the operation performance of the electronic device. The disclosed electronic device is directed to solve one or more problems in the art.

BRIEF SUMMARY OF THE DISCLOSURE

One aspect of the present disclosure provides an electronic device. The electronic device comprises a first part; a second part; a connector; and a shaft rotationally coupling the first part and the second part through the connector. End portions of the connector extend outside a connecting edge of the first part and a connecting edge of the second part, respectively. The shaft is coupled to the end portions of the connector. The shaft is disposed at an outer side of the connecting edge of the first part and an outer side of the connecting edge of the second part.

Other aspects of the present disclosure can be understood by those skilled in the art in light of the description, the claims, and the drawings of the present disclosure.

BRIEF DESCRIPTION OF THE DRAWINGS

In FIGS. 1-5, the various reference numerals and corresponding names are as follows: 1—first part, 2—second part, 3—connector, 4—shaft, 5—axis sleeve, 6—wire, 7—housing, 8—connecting edge; 31—first connector, 32—second connector, 41—first rotating shaft, 42—second rotating shaft, 43—intermediate gear, 44—friction sheet; 300—end portion, 401—first gear shaft section, 402—second gear shaft section.

DETAILED DESCRIPTION

Reference will now be made in detail to example of an embodiments of the disclosure, which are illustrated in the accompanying drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an improved electronic device which is able to prevent an accidental rotation of the touchscreen during an operation, thereby improving the operation performance of the electronic device, and enhancing the user experience of the electronic device.

Figure 1:
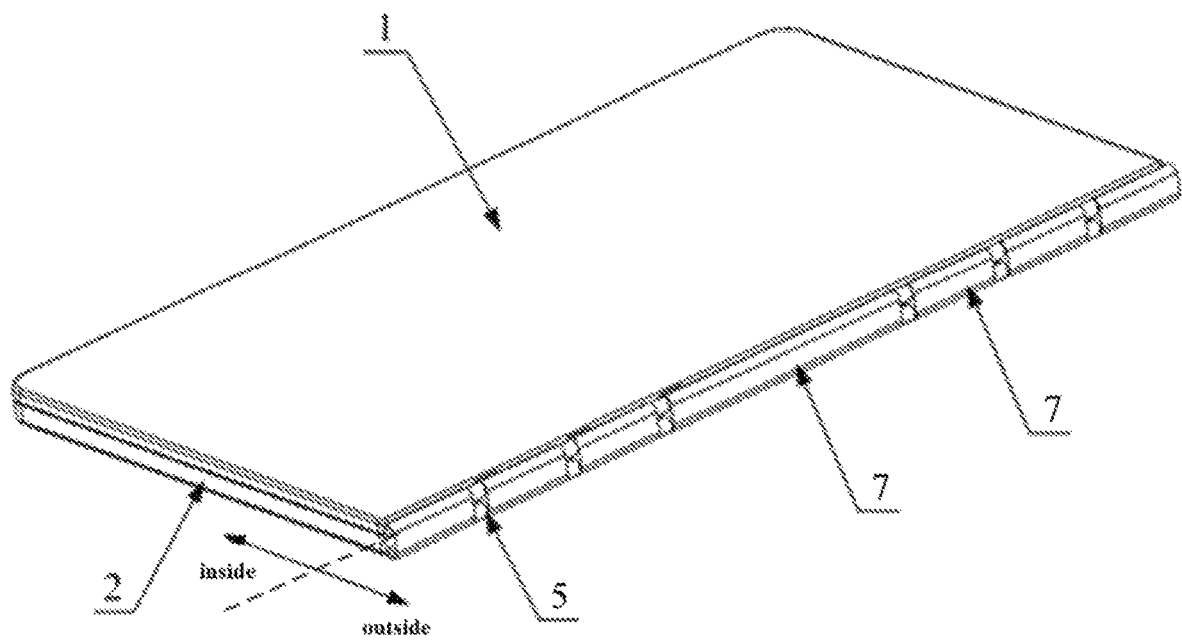
FIG. 1 illustrates a schematic diagram of an example of an electronic device consistent with disclosed embodiments.
Figure 2:
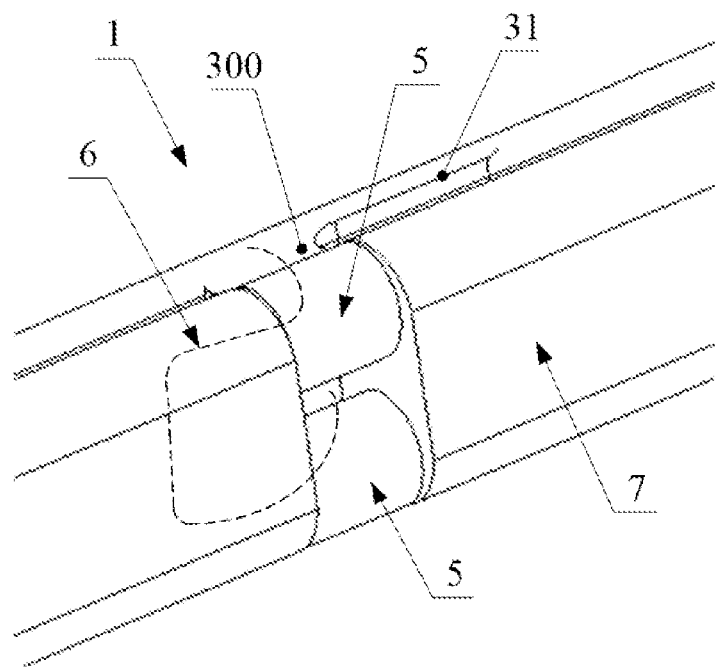
FIG. 2 illustrates a partial enlarged schematic diagram of an example of an electronic device in FIG. 1 consistent with disclosed embodiments.
Figure 3:
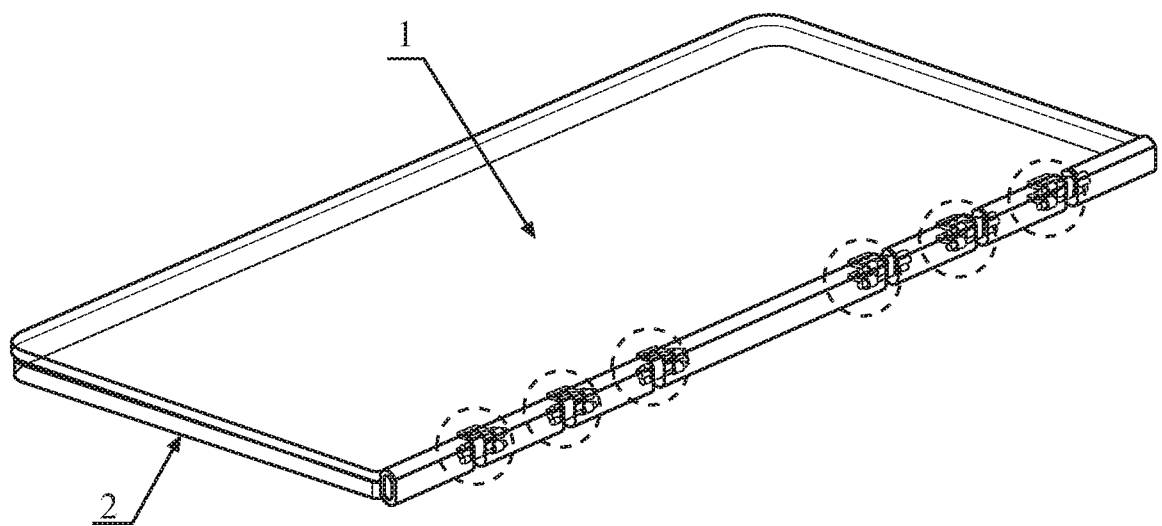
FIG. 3 illustrates an installation diagram of an example of a shaft in an example of an electronic device consistent with disclosed embodiments (an example of a shaft is shown in the dashed circle)
Figure 4:
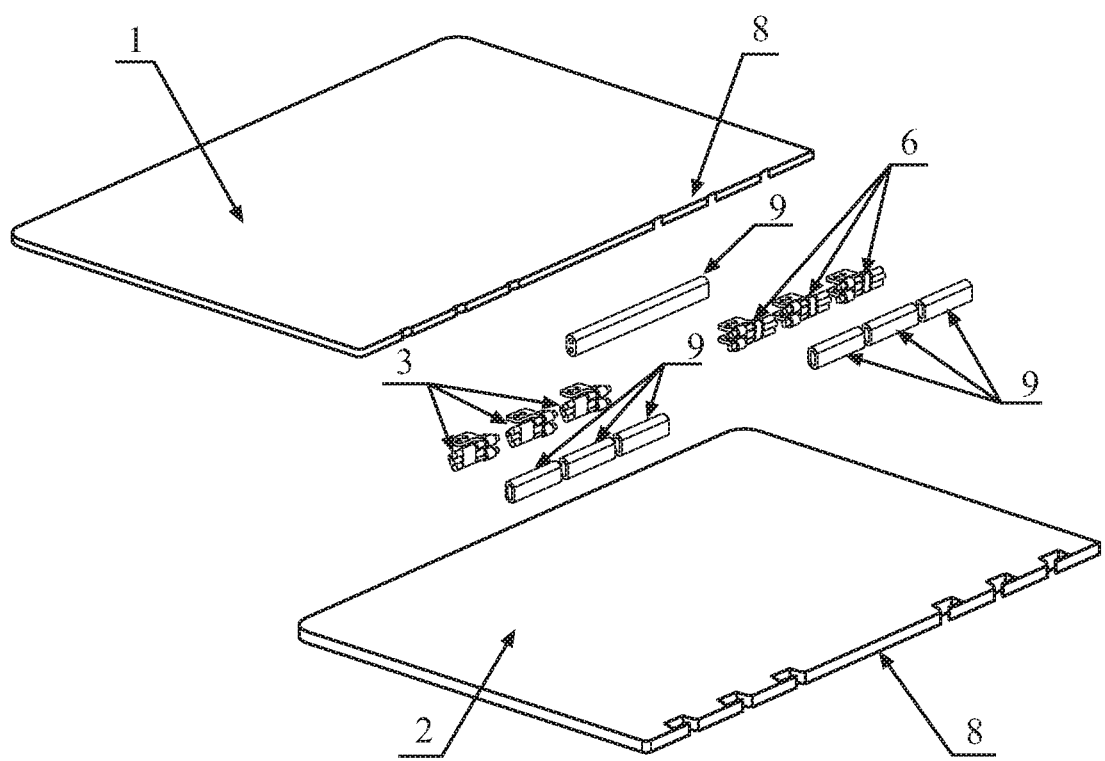
FIG. 4 illustrates a decomposition diagram of the installation diagram of an example of a shaft in FIG. 3 consistent with disclosed embodiments.
Figure 5:
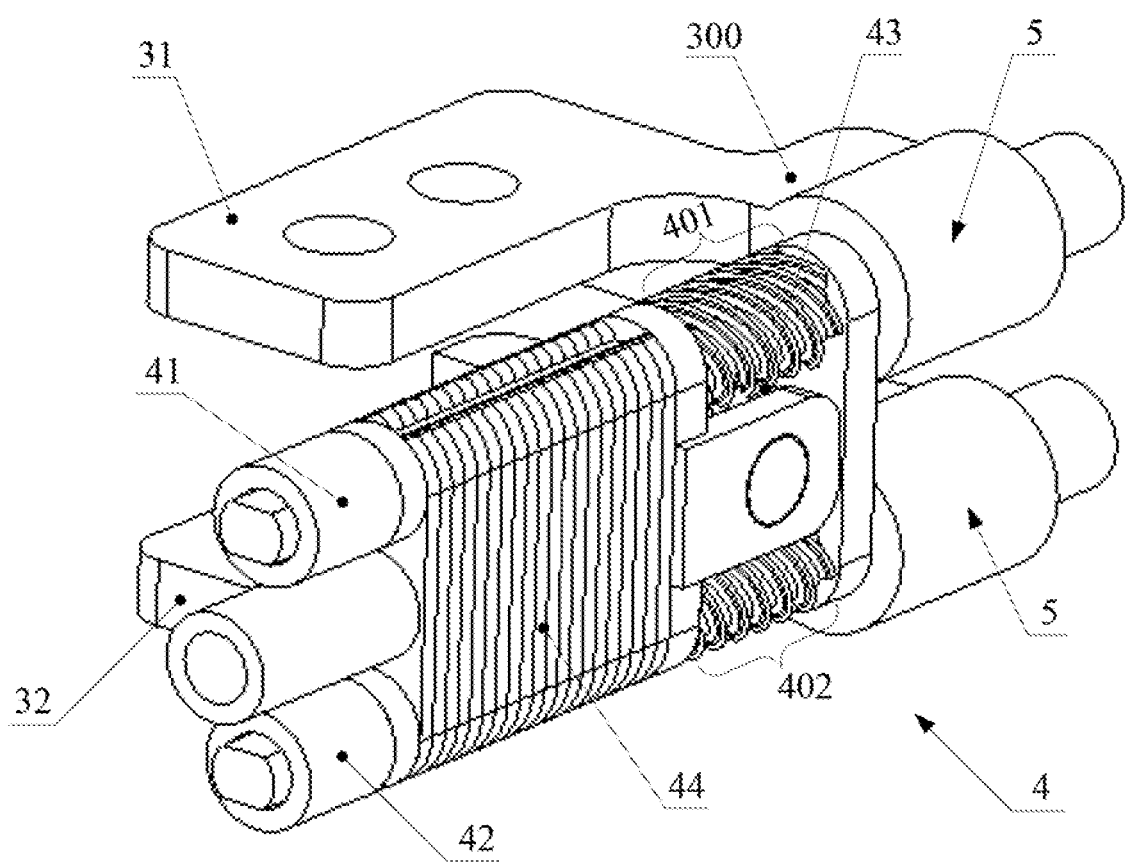
FIG. 5 illustrates a schematic diagram of an example of a shaft consistent with disclosed embodiments.

FIG. 1 illustrates a schematic diagram of an example of an electronic device consistent with disclosed embodiments. FIG. 2 illustrates a partial enlarged view of an example of an electronic device in FIG. 1 consistent with disclosed embodiments. FIG. 3 illustrates an installation diagram of an example of a shaft in an example of an electronic device consistent with disclosed embodiments (an example of a shaft is shown in the dashed circle). FIG. 4 illustrates a decomposition diagram of the installation diagram of an example of a shaft in FIG. 3 consistent with disclosed embodiments. FIG. 5 illustrates a schematic diagram of an example of a shaft consistent with disclosed embodiments.

As shown in FIGS. 1-5, the electronic device may comprise a first part 1, a second part 2, a connector 3, and a shaft 4. Other appropriate components may also be included. In particular, the connector 3 may be an individual member for realizing a connection function, and the shaft 4 may rotationally couple the first part 1 and the second part 2 through the connector 3.

In one embodiment, the electronic device may be a notebook, in which the first part 1 may be a screen of the notebook, and the second part 2 may be a body of the notebook, or vice versa. In addition, the electronic device may also include other electronic devices that can flip and fold, such as a mobile phone, a tablet, or any appropriate type of content-presentation devices.

The shaft 4 may be disposed on an outer side of the first part 1 and an outer side of the second part 2, such that the shaft 4 may be independently disposed with respect to the first part 1 and the second part 2. In one embodiment, as shown in FIGS. 4-5, the connector 3 provided to the first part 1 and the second part 2 may extend beyond the connecting edge 8 of the first part 1 and the connecting edge 8 of the second part 2, while the shaft 4 may be disposed at the end portion 300 of the connector 3 extending beyond the connecting edge 8.

Here, the connecting edge 8 of the first part 1 and the connecting edge 8 of the second part 2 may refer to the edges through which the first part 1 and the second part 2 are coupled to each other by the shaft, as FIG. 4 shows. For example, the first part 1 and the second part 2 each may have four edges, and the connecting edge 8 of the first part 1 and the connecting edge 8 of the second part 2 each may be one of the four edges through which the first part 1 and the second part 2 are coupled to each other by the shaft.

When the first part 1 and the second part 2 are in the expanded state of 180 degree (e.g., in a tabletop state), the outer side of the connecting edge 8 of the first part 1 may be located opposite to the outer side of the connecting edge 8 of the second part 2. For example, the second part may be disposed at the outer side of the connecting edge 8 of the first part 1. When the first part 1 and the second part 2 are in the closed state of 0 degree (e.g., an operation state) shown in FIG. 3), the outer side of the connecting edge 8 of the first part 1 may be located at the same side as the outer side of the connecting edge 8 of the second part 2.

In the disclosed electronic device, the shaft 4 may be disposed at the outer side of the connecting edge 8 of the first part 1 and the outside of the connecting edge 8 of the second part 2 (the direction of the outer side is indicated by the arrow in FIG. 1). That is, the shaft 4 may be no longer disposed at the inner side of the connecting edge 8 of the first part 1 and the inner side of the connecting edge 8 of the second part 2 (the direction of the inner side is indicated by the arrow in FIG. 1).

Nowadays, a touchscreen is often installed in the electronic device, the user applies touch force onto the touchscreen during a touch operation, and the retention force for the touchscreen to stay at the rotated position is provided by the torque structure. Thus, the retention force provided by the torque structure may have to be large enough to overcome the touch force.

Through disposing the shaft 4 at the outer side of the connecting edge 8 of the first part 1 and the outer side of the connecting edge 8 of the second part 2, the size of the shaft 4 may be no longer limited by the thickness of the electronic device. Instead, the structural dimensions of the shaft 4 may be determined according to the desired retention force.

For example, given substantially large structural dimensions of the shaft 4, a desired damping force may be generated by the torque structure, such that the corresponding retention force provided by the shaft 4 may be able to overcome the touch force. Thus, an accidental rotation of the touchscreen during a touch operation (i.e., when being touched by the user) may be prevented, and the user experience of the electronic device may be further improved.

Further, in one embodiment, as shown in FIGS. 1, 3 and 4, the electronic device may include two or more shaft 4, which are disposed at a connecting portion 9 of the first part 1 and the second part 2 at intervals. To further enhance the retention force provided to the first part 1 and the second part 2, in addition to independently configuring the size of the shaft 4, the number of the shaft 4 included in the electronic device may be increased. The number of the shaft 4 shown in FIGS. 1, 3 and 4 are for illustrative purposes and are not intended to limit the scope of the present disclosure.

Through disposing two or more shaft 4 at the connecting portion 9 of the first part 1 and the second part 2 at intervals, the force balance of the first part 1 and the second part 2 may be improved, which may enable a smooth flip-and-fold and stable positioning. Meanwhile, disposing two or more shaft 4 at the connecting portion 9 of the first part 1 and the second part 2 at intervals may also improve the appearance of the electronic device.

In one embodiment, as shown in FIG. 5, the shaft 4 may be a 360-degree shaft including a first rotating shaft 41, a second rotating shaft 42, a transmission structure and a torque structure. The 360-degree shaft may be able to realize the 360-degree inversion of the first part 1 and the second part 2 based on the dual axis technology, thereby providing a plurality of variable operation forms, satisfying various user demands, and enhancing the performance of the electronic device. In another embodiment, the shaft 4 may be a conventional shaft that includes only one shaft and only allows the first part 1 and the second part 2 to rotate relative to each other within a certain angular range (typically less than 180 degree).

In the shaft 4, the first rotating shaft 41 and the second rotating shaft 42 may be arranged in parallel, the first rotating shaft 41 may be coupled to the first part 1 through the first connector or connector 31, and the second rotating shaft 42 may be coupled to the second part 2 through the second connector or connector 32. Linkage of the first rotating shaft 41 and the second rotating shaft 42 may be realized through the transmission structure, and the torque structure may be sleeved at the first rotating shaft 41 and the second rotating shaft 42, respectively.

During the rotation of the first part 1 and the second part 2, the rotation axis of the first part 1 may be the axis of the first rotation shaft 41, and the rotation axis of the second part 2 may be the axis of the second rotation shaft 42. That is, the first part 1 may rotate around the axis of the first rotation shaft 41, and the second part 2 may rotate round the axis of the second rotation shaft 42. Meanwhile, based on the linkage of the first rotating shaft 41 and the second rotating shaft 42, a relative rotation of the first part 1 and the second part 2 may be realized. That is, the aforementioned dual axis technology may be realized.

When the first rotation shaft 41 is rotated with the first part 1, the transmission structure may transmit the rotational force of the first rotation shaft 41 to the second rotation shaft 42, such that the second part 2 coupled to the second rotation shaft 42 may rotate in reverse to the first part 1, and a 360-degree rotation of the first part 1 and the second part 2 may be realized finally.

Meanwhile, during the rotation of the first rotating shaft 41 and the second rotating shaft 42, a torque force may be generated between the torque structure and the two rotating shafts (i.e., the first rotating shaft 41 and the second rotating shaft 42), which may provide a retention force for the relative positioning of the first part 1 and the second part 2.

Further, as shown in FIG. 5, the transmission structure may include a first gear shaft segment 401, a second gear shaft segment 402, and an intermediate gear 43. The first gear shaft segment 401 may be disposed on the first rotating shaft 41, and the second gear shaft segment 402 may be disposed on the second rotating shaft 42. The intermediate gear 43 may be disposed between the first gear shaft segment 401 and the second gear shaft segment 402 and, meanwhile, engage with the first gear shaft segment 401 and the second gear shaft segment 402, respectively.

The first gear shaft segment 401 may be provided by forming gear teeth (e.g., oblique gear teeth) on the outer peripheral surface of the first rotating shaft 41, and the second gear shaft portion 402 may be provided by forming gear teeth (e.g., oblique gear teeth) on the outer peripheral surface of the second rotating shaft 42. There is often a size requirement for the shaft 4 to be mounted on an electronic device having a substantially small thickness. Through adopting the processed first gear shaft segment 401 and the second gear shaft portion 402, instead of directly disposing oblique gear teeth on the first rotating shaft 41 and the second rotating shaft 42, the overall size of the entire shaft 4 may be reduced, and the installation requirement of the shaft 4 on the electronic device may be satisfied.

In one embodiment, through the transmission structure shown in FIG. 5, the first rotating shaft 41 and the second rotating shaft 42 may be synchronously rotated. That is, the first part 1 may rotate around the axis of the first rotation shaft 41 and, meanwhile, the second part 2 may synchronously rotate around the axis of the second rotation shaft 42, such that the flip and fold of the electronic device may be more quickly and easily.

In another embodiment, the first shaft 41 and the second shaft 42 may not be rotated synchronously. The flip and fold of the electronic device may be realized by respectively rotating the first part 1 and the second part 2.

In one embodiment, as shown in FIG. 5, the torque structure may include a plurality of friction sheets 44 fitted together. The first rotation shaft 41 and the second rotation shaft 42 may pass through all the friction sheets 44, and the friction sheets 44 may be arranged closely together. For example, the friction sheet 44 may have a ring shape, and the first rotation shaft 41 and the second rotation shaft 42 may penetrate the friction sheet 44 through the opening of the ring structure.

The torque structure comprising a plurality of friction sheets 44 may have a substantially small size but provide substantially large and stable retention force, which may not only satisfy the installation requirements of the electronic device with a substantially small thickness, but also enhance the performance of the shaft 4. In another embodiment, the torque structure may have a shrapnel structure, a disc-like structure, a tooth-like structure or a covered structure.

Further, as shown in FIGS. 2 and 5, the end portion 300 of the first connector 31 may be coupled to one axis sleeve 5, and the end portion 300 of the second connector 32 may be coupled to another axis sleeve 5. The two axis sleeves 5 may be sleeved at the outside surface of the first rotating shaft 41 and the second rotating shaft 42, respectively. The connection of the first connector 31 and the second connector 32 to the rotating shafts (e.g., the first rotating shaft 41 and the second rotating shaft 42) may be realized in various ways.

In one embodiment, as shown in FIGS. 2 and 5, the first connector 31 and the second connector 32 may adopt the axis sleeves 5 to tighten the first rotating shaft 41 and the second rotating shaft 42, respectively, thereby realizing the connection of the first connector 31 to the first rotating shaft 41 and the connection of the second connector 32 to the second rotating shaft 42.

Meanwhile, an inner cavity may be formed in the portion of the first rotating shaft 41 near the corresponding axis sleeve 5, and an inner cavity may be formed in the portion of the second rotating shaft 42 near the corresponding axis sleeve 5. The wire 6 drawn from the first part 1 may be inserted into the second part 2 through the inner cavities.

Thus, the shaft 4 may achieve a reliable connection of the first connector 31 and the second connector 32 to the rotating shafts (e.g., the first rotating shaft 41 and the second rotating shaft 42) and a wire distribution function may be realized at the same time. The wire 6 coupling the first part 1 and the second part 2 may be better hidden and, thus, the appearance of electronic device may be more succinct and visually effective.

In another embodiment, without considering the wire distribution function, the connection of the connector 3 to the rotating shafts (e.g., the first rotating shaft 41 and the second rotating shaft 42) may be realized in other ways. For example, the connector 3 may be integrally provided in a flat shape and welded integrally with the rotating shafts.

Further, as shown in FIGS. 1 and 4, the shaft 4 may be covered with a plurality of decorative housings 7, which may be subjected to a surface treatment such as electroplating. The decorative housings 7 may cover the transmission structure and the torque structure of the shaft 4, such that the electronic device may have a better appearance integrity, and the appearance of the electronic device may be further improved.

Further, in one embodiment, as shown in FIG. 1, FIG. 3 (the shafts 4 are shown in the dashed circles) and FIG. 4, in the electronic device including a plurality of shafts 4, one of the shafts 4 may be disposed near one end of the connecting edge 8, and the other of the shafts 4 may be disposed near the other end of the connecting edge 8. The shafts 4 disposed near one end of the connecting edge 8 may be arranged symmetrically with respect to the shafts 4 disposed near the other end of the connecting edge 8.

Through disposing the plurality of shafts 4 at intervals and, meanwhile, symmetrically arranging the shafts 4 disposed near the two ends of the connecting edge 8, the force balance of the first part 1 and the second part 2 may be further improved, and the performance of the electronic device may be further enhanced.

The disclosed electronic device may comprise a first part, a second part, a connector, and a shaft. The shaft may rotationally couple the first part to the second part through the connector, thereby realizing a flip-and-fold of the first part with respect to the second part. In particular, the end portions of the connector may extend outside a connecting edge of the first part and a connecting edge of the second part, respectively.

The shaft may be coupled to the end portions of the connector, such that the shaft is disposed at an outer side of the connecting edge of the first part and an outer side of the connecting edge of the second part. Through disposing the shaft at the outer side of the connecting edge of the first part and the outer side of the connecting edge of the second part, rather than the inner side of the connecting edge of the first part and the inner side of the connecting edge of the second part, the shaft may be arranged independently of the first part and the second part.

Thus, the dimensions of the shaft may be no longer limited by the thickness of the first part and the second part, and the dimensions of the shaft to be determined according to the desired retention force, ensuring that the shaft can provide desired torque to counteract and overcome the touch force. Accordingly, an accidental rotation of the touchscreen during the touch operation may be prevented, and the user experience of the electronic device may be further enhanced.

In the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present specification are described in a progressive manner, in which each embodiment focusing on aspects different from other embodiments, and the same and similar parts of each embodiment may be referred to each other. Since the disclosed electronic device corresponds to the disclosed information processing method, the description of the disclosed electronic device is relatively simple, and the correlation may be referred to the method section. The overall and partial structure of the electronic device and the shaft may be referred to the combination of the various disclosed structures.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An electronic device, comprising:
    a first part;
    a second part;
    a connector assembly including a first connector and a second connector;
    a shaft assembly rotationally coupling the first part and the second part through the connector assembly, the shaft assembly including:
        a first rotating shaft coupled to the first part through the first connector, wherein the first part rotates around an axis of the first rotating shaft;
        a second rotating shaft arranged in parallel with the first rotating shaft and coupled to the second part through the second connector, wherein the second part rotates around an axis of the second rotating shaft;
        a torque structure configured to provide a retention force for the first part and the second part to stay at a relative position; and
        a transmission structure linking the first rotating shaft and the second rotating shaft, the transmission structure including a first gear shaft segment disposed on the first rotating shaft, a second gear shaft segment disposed on the second rotating shaft, and an intermediate gear disposed between the first gear shaft segment and the second gear shaft segment and engaging with the first gear shaft segment and the second gear shaft segment;
    a first axis sleeve coupled to a first end portion of the first connector and sleeved outside the first rotating shaft; and
    a second axis sleeve coupled to a second end portion of the second connector and sleeved outside the second rotating shaft;
    wherein:
        the first end portion of the first connector and the second end portion of the second connector extend outside a connecting edge of the first part and a connecting edge of the second part, respectively,
        the first rotating shaft and the second rotating shaft are coupled to the first end portion and the second end portion, respectively,
        the shaft assembly is disposed at an outer side of the connecting edge of the first part and an outer side of the connecting edge of the second part, and
        the torque structure includes a plurality of friction sheets, each of the plurality of friction sheets:
            being in direct contact with a neighboring friction sheet,
            having an elongated shape, and
            being passed through by both the first rotating shaft and the second rotating shaft.

2. The electronic device according to claim 1, further including:
    a first inner cavity disposed in a portion of the first rotating shaft near the first axis sleeve; and
    a second inner cavity disposed in a portion of the second rotating shaft near the second axis sleeve,
    wherein a wire drawn from the first part is inserted into the second part through the first inner cavity and the second inner cavity.

3. The electronic device according to claim 1, further including:
    a surface treated housing covering the shaft assembly and not covering the first axis sleeve and the second axis sleeve.

4. The electronic device according to claim 3, wherein:
    the shaft assembly is one of two shaft assemblies of the electronic device, the two shaft assemblies being disposed at an interval and arranged symmetrically along the connecting edge between the first part and the second part; and
    the surface treated housing is one of two surface treated housings of the electronic device, each of the two surface treated housings covering one of the two shaft assemblies, and the two surface treated housings being spaced from each other by the first axis sleeve and the second axis sleeve of one of the two shaft assemblies.

5. The electronic device according to claim 4, wherein:
    the two surface treated housings do not have a same length.

6. The electronic device according to claim 1, wherein each of the first gear shaft segment and the second gear shaft segment includes oblique gear teeth on an outer peripheral surface of the each of the first gear shaft segment and the second gear shaft segment.

7. The electronic device according to claim 1, wherein a rotation axis of the intermediate gear is approximately perpendicular to rotation axes of the first gear shaft segment and the second gear shaft segment.

8. The electronic device according to claim 1, wherein:
    when the first part and the second part are arranged in an expanded state of 180 degrees, the outer side of the connecting edge of the first part faces the outer side of the connecting edge of the second part; and
    when the first part and the second part are arranged in a closed state of 0 degrees, the outer side of the connecting edge of the first part and the outer side of the connecting edge of the second part are arranged as one stacked on another and face a same direction.

9. The electronic device according to claim 1, wherein:
the transmission structure allows the first part and the second part to synchronously rotate surrounding the axis of the first rotation shaft and the axis of the second rotation shaft, respectively.

10. The electronic device according to claim 1, wherein:
the shaft assembly is one of two or more shaft assemblies of the electronic device, the two or more shaft assemblies being disposed at a connecting portion between the first part and the second part with a predetermined interval.

11. The electronic device according to claim 10, wherein:
a first one of the two or more shaft assemblies is disposed near a first end of the connecting edge;
a second one of the two or more shaft assemblies are disposed near a second end of the connecting edge opposite to the first end of the connecting edge; and
the first one of the two or more shaft assemblies is arranged symmetrically with respect to the second one of the two or more shaft assemblies.

12. The electronic device according to claim 1, further including:
a surface treated housing covering the shaft assembly.

13. The electronic device according to claim 1, wherein:
the electronic device includes a notebook, the first part is a screen of the notebook, and the second part is a body of the notebook.

14. The electronic device according to claim 1, wherein:
the shaft assembly comprises a 360-degree shaft assembly realizing a 360-degree inversion of the first part and the second part.

15. The electronic device according to claim 1, wherein:
the electronic device includes a mobile phone, the first part is a screen of the mobile phone, and the second part is a body of the mobile phone.

16. The electronic device according to claim 1, wherein:
the shaft assembly is one of three or more shaft assemblies of the electronic device, the three or more shaft assemblies being disposed at intervals and arranged symmetrically along a connecting edge between the first part and the second part.

17. The electronic device according to claim 1, wherein:
the first part includes a first recess configured to accommodate the first connector; and
the second part includes a second recess configured to accommodate the second connector.

* * * * *